United States Patent Office 3,453,039
Patented July 1, 1969

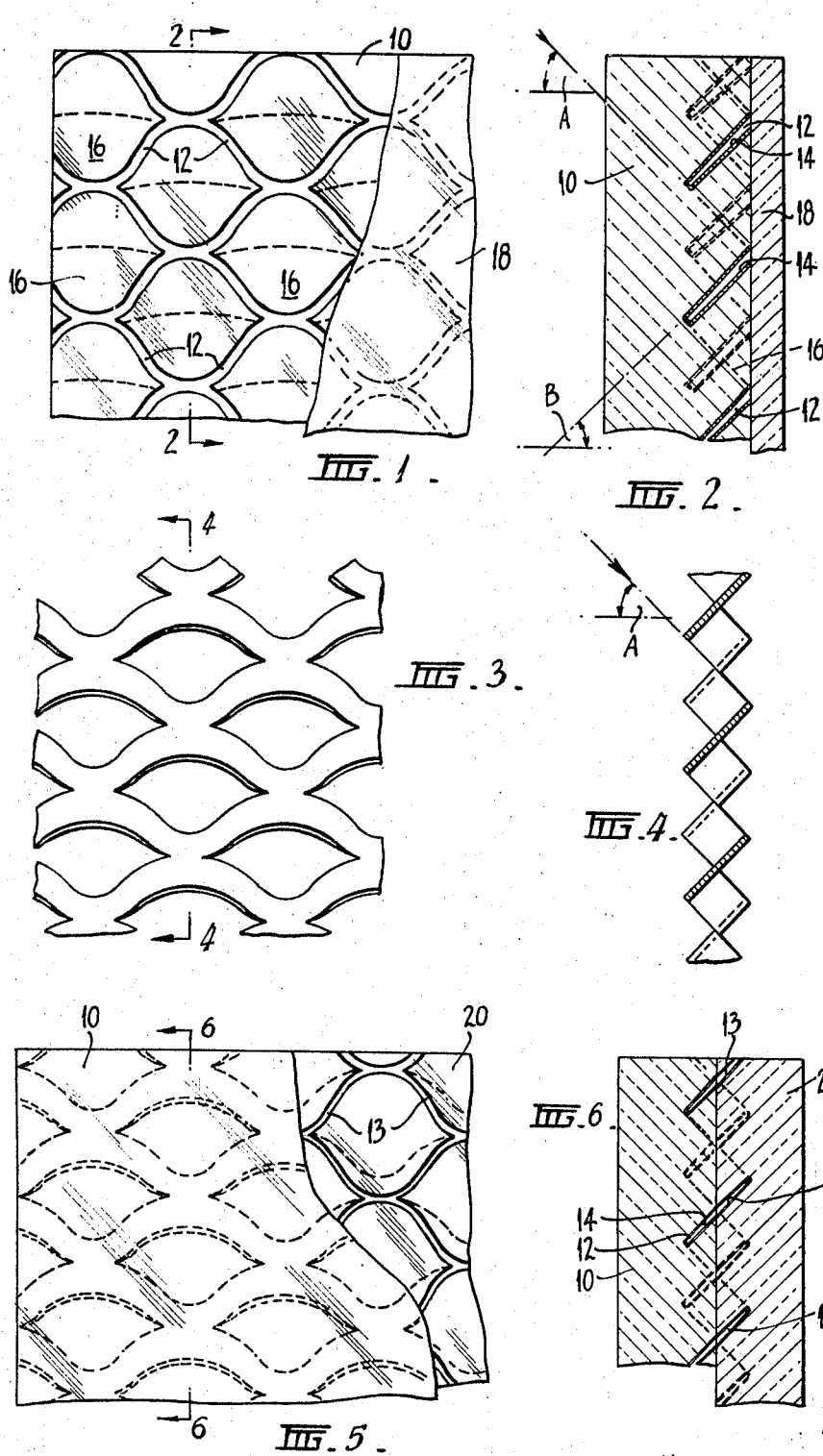

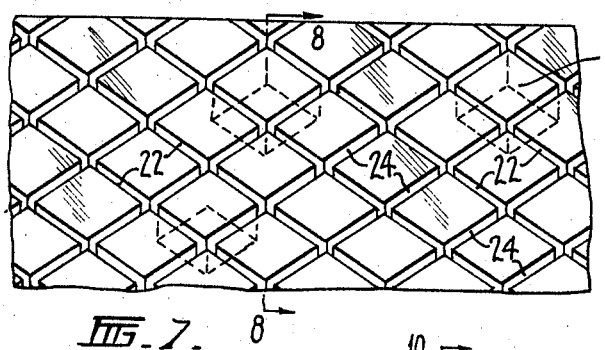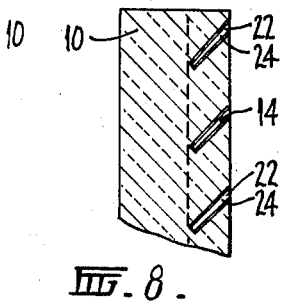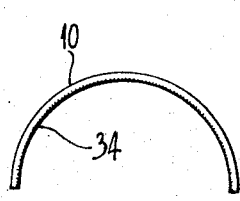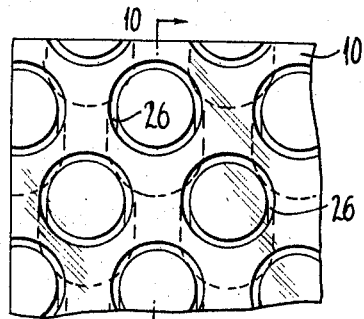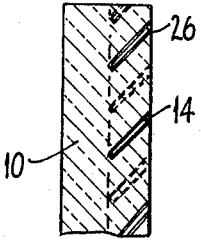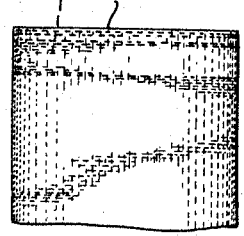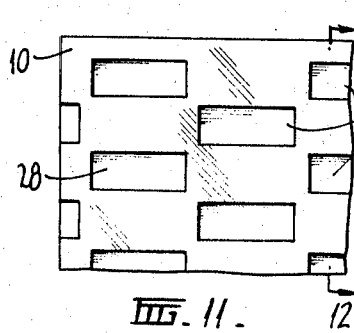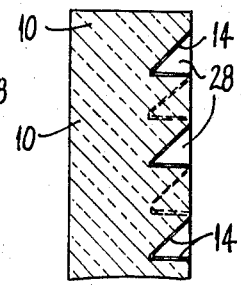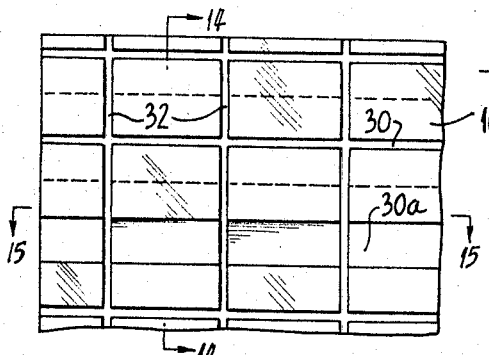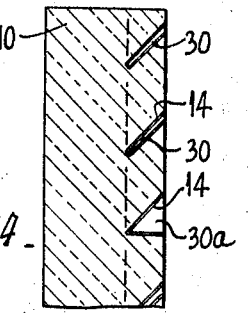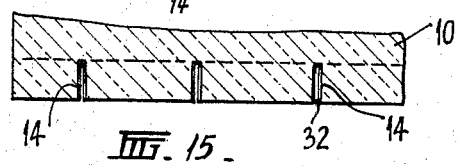
INVENTOR
HAROLD NORMAN OSBORNE
By Young & Thompson
ATTYS.

3,453,039
COMPOSITE LIGHT TRANSMITTING AND LIGHT REFLECTING PANELS AND THE LIKE
Harold Norman Osborne, 225 Springvale Road, Glen Waverley, Victoria, Australia
Filed July 16, 1965, Ser. No. 472,456
Claims priority, application Australia, July 17, 1964, 47,079/64
Int. Cl. G02b *17/08, 27/00*
U.S. Cl. 350—260      5 Claims

ABSTRACT OF THE DISCLOSURE

A composite light-transmitting and light-reflecting panel comprises a pair of sheets of transparent material with obliquely disposed slot-like depressions in the confronting surfaces of each sheet. The interiors of the depressions have reflective metal coatings so as to form a reflective three-dimensional apertured screen within the composite panel.

---

This invention relates to composite panels incorporating reflecting screens, suitable among other things for use in the construction of windows, transparent curtain walls, roof lights and light fittings.

The problem of suitably controlling the heat intake through, and the glare from windows and glass walls exposed to direct solar radiation is common to most buildings in climates where the summer temperatures are high, but is experienced in its most acute form in buildings with sheet glass curtain walls, particularly those with easterly and westerly aspects. In some types of buildings, a useful and perhaps adequate degree of sun control is obtainable by means of projecting shading elements arranged horizontally and/or vertically above and at the sides respectively of the windows, but this remedy is generally not available in the case of glass curtain walls, roof lights and other large glass areas owing to constructional difficulties and/or aesthetic considerations.

It is an object of this invention to provide improved composite panels suitable for the foregoing and other like purposes.

Accordingly, the invention in one of its broad aspects, provides a composite panel comprising a sheet of transparent material having at least one side thereof formed with the shape of an apertured screen, and wherein said screen shape is coated with material which forms a reflective screen in situ on the sheet.

Thus, light and radiant heat are transmitted through the screen apertures but are reflected from the screen elements constituted by the coated areas of the sheet.

The screen is thus formed in situ on the transparent sheet and the said reflective coating which is preferably opaque, is preferably formed of a suitable metal applied in any suitable way such as by chemical deposition, vacuum metallising, or by a spraying operation.

Preferably, the said screen comprises angularly disposed coated surfaces which incline generally forwardly (i.e. towards the exterior of the panel from the interior thereof) at a suitable angle or angles and which preferably, define intervening closely spaced transparent areas or openings arranged in a multiplicity of rows.

More particularly, one preferred form of screen comprises superposed rows of forwardly and downwardly inclined hood-like reflective elements each of which extends above and at least partly around the sides of a corresponding opening or clear space in the screen. Thus, the screen may be similar in form to expanded sheet metal of the known kind providing successive rows of hooded openings and in which the openings in each row are staggered relatively to those in the two adjacent rows on opposite sides thereof.

In another form, the screen may comprise spaced, parallel, louvre-like elements defining intervening slot-like openings and if desired the latter may be subdivided by reflective elements disposed at right angles to the louvre-like elements.

The transparent sheet may be formed of glass or transparent plastic and that face thereof on which the screen is formed is preferably covered by a second transparent sheet which may be cemented thereto or the two transparent sheets may be sealed together at their edges only.

According to another modification, the screen is formed partly on the inner sides of each of two transparent sheets arranged the one behind the other in parallel relationship and with or without the interposition of a reinforcing sheet of transparent material.

It will be evident that the present invention permits of the use of a wider range of screen forms than can be obtained with preformed screens in which all of the reflective elements are necessarily interconnected whereas the screen of a panel according to the present invention may comprise spaced reflective elements which are not interconnected.

In the preferred form of the invention that face of the transparent sheet on which the screen is formed is preferably generally flat or curved but is formed with spaced indentations or depressions and the said reflective coatings are formed on the surfaces of the latter.

The said indentations or depressions in the transparent sheet may be formed in any suitable manner such as by casting the sheet in a suitable mould, or by a rolling or plastic moulding operation or again, and particularly in the case of a synthetic plastic sheet, the required screen form may be produced by machining an initially plain sheet to form indentations or depressions therein.

Composite panels according to the invention may be flat as usually required for the windows and transparent curtain walls, or they may be curved in cross section for use as roof lights and the like. More generally, the word "panel" is to be understood as comprehending any sheet-like member irrespective of its shape as viewed either from the front or from a side or end.

The reflective members forming the screen and the openings between those members may have any suitable dimensions within the limits imposed by the thickness of the panel, provided that corresponding geometrical relationships are maintained. However, for most applications, it is necessary or desirable that the screen should be aesthetically pleasing and that it should not interfere unduly with vision through the panel. The degree of discernment of the screen is an optical phenomenon depending upon brightness contrast, ocular accommodation and visual acuity. In this regard, it has been found that when the width of the screen openings is of the order of 0.2 of an inch or less and the reflective members are correspondingly small in size, the screen is not usually discerned as such from a distance of about ten or twelve feet but merely has the effect of imparting a greyish appearance to the panel.

Representative embodiments of the invention are hereinafter more fully described with reference to the accompanying drawings in which:

FIGURE 1 is a view in elevation of one form of composite panel according to the invention;

FIGURE 2 is a view in sectional side elevation taken on the line 2—2 of FIGURE 1, FIGURE 3 is a view in elevation of a strip of a known type of expanded sheet metal, FIGURE 4 is a view in sectional side elevation taken on the line 4—4 of FIGURE 3, FIGURES 5, 7, 9, 11 and 13 are views in elevation of modified forms of composite panels according to the invention, FIGURES 6, 8, 10, 12 and 14 are views in sectional side elevation of the panels shown in FIGURES 5, 7, 9, 11 and 13 respectively, FIGURE 15 is a sectional view taken on the line 15—15 of FIGURE 13, FIGURE 16 is a view in end elevation of a roof light member, and FIGURE 17 is a view in plan of the roof light member shown in FIGURE 16.

The composite panel shown in FIGURES 1 and 2 comprises a sheet 10 of transparent glass or of a suitable synthetic plastic of uniform thickness having superposed rows of deep narrow slots or indentations 12 formed in its interior or rear surface to define a required screen shape. These slots or indentations incline forwardly and downwardly at a steep angle which may for example be an angle of 45° and are of horizontally disposed sinuous form when viewed from the rear as shown at the left of FIGURE 1 and the spaced crests of each slot register with and merge into the troughs of the sinuous slot, disposed immediately thereabove.

The surface of the slots 12 are provided with thin reflective coatings 14 of a suitable metal and preferably with coatings of aluminium applied by the well known vacuum metallising method as in this way highly reflective coatings are produced. Alternatively, the metal coatings may be formed by chemical deposition, metal spraying or in any other suitable way. If the coating procedure is such that a coating of the metal is also unavoidably applied at the same time to the flat rear face of the sheet 10, the coating thus formed thereon is subsequently removed. This operation may be facilitated by applying a removable barrier coating of any suitable material to the said flat rear face prior to the metal coating operation.

Thus, the metal coatings 14 formed on the surfaces of the slots or indentations constitute elements of a nonplanar reflective sun screen which is formed in situ on the back of the transparent sheet and which is located wholly between the front and rear faces thereof.

More particularly, the metal screen shown in FIGS. 1 and 2 comprises superposed, horizontally extending sinuous elements of ribbon-like form which inclined forwardly and downwardly and which are arranged so that the crests of each such element are aligned with and merge into the troughs of the similar sinuous element disposed immediately thereabove. Thus, a horizontal row of spaced openings 16 is formed between each adjacent pair of sinuous screen elements and the openings in each row are staggered relatively to these in the two rows disposed immediately thereabove and therebelow.

This screen is therefore somewhat analogous in shape to that of the known type of expanded sheet metal shown in FIGS. 3 and 4 but is not identical thereto.

Expanded sheet metal is produced by forming rows of spaced slits in an originally plain sheet and by then stretching the sheet at right angles to the slits. During this stretching operation, each initially straight strip defined by and lying between each adjacent pair of rows of slits is deformed into a sinuous shape and is tilted relatively to the plane of the sheet as shown in FIG. 4.

Consequently, if a sheet of expanded metal is arranged vertically as shown in FIG. 4 and used as a sun screen with the horizontally extending sinuous strips thereof inclining forwardly and downwardly as shown, these sinuous strips intercept all direct rays when the altitude of the sun is not less than a particular cut-off angle "A" which in the particular screen shown in FIG. 4 is 45°.

Similarly, the screen of the composite panel shown in FIGS. 1 and 2 has a cut-off angle "A" of 45° and the sinuous elements thereof are inclined forwardly and downwardly at an angle "B" which in FIG. 2 is also 45° through the cut-off and inclination angles are not necessarily the same but are preferably selected with reference to the latitude where the screen is to be used, the aspect of the screen, the shading effect desired and other relevant considerations. For many purposes, the angle "B" is advantageously larger than the cut-off angle "A" so as to reflect incident light outwardly instead of inwardly when the altitude of the sun is a little less than that of the cut-off angle.

More generally, the geometry of the screen is preferably selected to suit the required conditions in a particular location and in this connection it is sometimes desirable to displace the screen form angularly in its own plane so that for example the parallel rows of apertures of the screen shown in FIGS. 1 and 2 may be arranged at an angle to the horizontal plane.

After the metal coatings 14 have been formed, a protective sheet 18 of glass or clear plastic is preferably cemented or otherwise secured to the back of the transparent sheet 10.

The slots 12 are preferably as narrow in width as is practicable having regard to the manner in which they are formed and to the requirements of the particular metal coating method employed. Also the said slots are preferably approximately uniform in width though the moulding operation is facilitated if they taper inwardly to some extent as shown in FIG. 2.

In some cases, it may be advantageous to utilise composite panels according to the invention to control the solar load on the fenestration of existing buildings. Thus, a composite panel may be arranged either in front of or behind an existing window and preferably in contact therewith. When as is preferred, the screen panel is arranged behind the window in which case, the required screen shape is preferably formed on or in the front face of the composite panel instead of on or in the rear face thereof as shown in FIGS. 1 and 2.

In the modification shown in FIGS. 5 and 6, the shading screen formed by the metal coating 14 is substantially identical in shape to that of the expanded metal shown in FIGS. 3 and 4 and this is achieved by forming the screen partly in the rear face of the front transparent sheet 10 and partly in the adjacent face of a rear transparent sheet 20 which is cemented or otherwise secured thereto.

Thus, forwardly and downwardly inclined slots 12 are formed in the rear face of the front sheet 10 and upwardly and rearwardly inclined slots 13 are formed in the forward face of the rear sheet 20 and the plane of the meeting faces of the two sheets passes centrally through the screen as will be apparent from FIG. 6.

If the transparent sheets 10 and 20 are formed of glass, a thin reinforcing sheet (not shown) of clear plastic may be interposed between and cemented to the glass sheets.

FIGURES 7 and 8 show another modification in which the back of the sheet 10 is formed with a series of equally spaced straight parallel slots 22 which incline downwardly towards the right in FIG. 7 and with a second series of similarly spaced slots 24, which intersect the slots 22 and which incline downwardly towards the left of the figure. The plane of each of these slots is obliquely disposed relatively to the faces of the sheet so that they incline downwardly and forwardly when viewed in section as in FIG. 8.

The intersecting slots 22 and 24 thus form diamond shaped cells which are tilted forwardly and downwardly as shown by the dotted lines in FIG. 7 and the surfaces thereof are provided with reflective metal coatings 14 as previously described. As the slots 22 and 24 are straight, they may readily be cut in the surface of an initially plain sheet of clear plastic though alternatively they may be moulded therein.

The composite panel shown in FIGS. 9 and 10 comprises a clear sheet 10 formed with a spaced series of forwardly and downwardly slots 26 of tubular or annular form and the surfaces of which are similarly provided with reflective metal coatings 14. Thus, the screen of this panel consists of disconnected reflective elements and a similar result could be obtained by forming closely spaced and similarly inclined circular holes in the sheet 10.

In the further modification shown in FIGS. 11 and 12 the rear face of the clear sheet 10 is formed with horizontal rows of spaced slots 28 arranged in staggered relationship. Unlike the slots shown in the preceding figures, these slots 28 are not of undercut form but are open for the full vertical extent thereof. These slots are thus of triangular shape in cross section and have their lower sides disposed horizontally. Slots of this cross sectional shape are thus more readily formed and may for example be formed by the known process of forming figured rolled glass. It will be noted that slots of this form do not reduce the area of the intervening clear spaces as viewed horizontally or upwardly though they do reduce forward and downward vision through the panel.

FIGS. 13, 14 and 15 show a composite panel incorporating still another form of screen which comprises spaced horizontal, forwardly and downwardly inclined reflective and shading elements 30 of louvre-like form subdivided by spaced vertical partition elements 32. For this purpose, the back of the sheet 10 is formed with spaced horizontally extending inclined slots 12 and with spaced vertical slots 30 arranged at right angles to the flat face of the sheet as shown in FIG. 15, the surfaces of these horizontal and vertical slots being provided with reflective metal coatings 14. As shown at 30 in the upper part of FIG. 14, the horizontal slots may be of undercut form while alternatively, as shown at 30a in the lower part of the figure, they may be of the aforesaid open triangular shape.

It will be understood that the aforesaid flat panels may be arranged vertically or horizontally or at any required intermediate angle it being understood that, irrespective of its attitude, the screen may be designed to provide a required shading effect.

It will be understood that although the screens of the composite panels described above could have the dimensions shown in the drawings, they are for most purposes, preferably very much smaller in size for the reason previously referred to herein. In this connection, it will be apparent that the shading effect obtained is substantially unchanged if all dimensions are reduced in proportion.

A composite panel according to the invention is not necessarily flat but may have any suitable form which is desirable or necessary for aesthetic reasons or structural requirements. Thus, by way of example, FIGS. 16 and 17 show a composite panel of semi-circular shape in cross section suitable for use as a roof light of inverted trough form. This panel similarly to those illustrated in the preceding figures comprises a transparent panel 10 provided on its inner face with a screen 34 which is formed in situ thereon by metallising the surfaces of indentations formed in the said inner surface.

While composite panels and the like according to the invention have been devised primarily for use in controlling the admission and reflection of solar radiation, they are also suitable generally for the purpose of controlling the admission and reflection of light and radiant heat while at the same time providing a decorative effect. Thus, among other things, such panels and the like may be used as, or in the construction of, light fittings.

1. A composite panel comprising a front sheet of transparent material, a rear sheet of transparent material arranged parallel to and behind said front sheet and in close proximity thereto, said front and rear sheets being secured together, the rear face of said front sheet being formed with spaced slot-like depressions which extend obliquely toward the front face thereof and which define the form of the forward portion of a three-dimensional apertured screen, the forward face of said rear sheet being formed with spaced slot-like depressions which extend obliquely toward the rear face thereof and which define the form of the rearward portion of said screen, and a reflective three-dimensional, apertured screen comprising reflective metal coatings formed on the surfaces of said depressions in said front and rear sheets.

2. A composite panel according to claim 1 wherein said screen defines parallel rows of small apertures of approximate diamond shape and wherein the apertures in each row are staggered relative to the apertures in the contiguous rows on opposite sides thereof.

3. A composite panel according to claim 1, wherein said screen comprises closely spaced ribbon-like reflective elements extending transversely across the width of the panel, each such element being of sinuous form when viewed from the front and being disposed in staggered relationship relative to the contiguous elements on each side thereof and so that the spaced crests of each such element merge with the spaced troughs of the element disposed immediately above it, and wherein, when the screen is viewed from the side, said ribbon-like elements are disposed approximately parallel to each other and present an inclined louvre-like appearance.

4. A composite panel according to claim 1 wherein said front and rear sheets are cemented together.

5. A composite panel according to claim 1 including a thin reinforcing sheet of transparent plastic material interposed between and secured to said front and rear transparent sheets.

References Cited

UNITED STATES PATENTS

| | | | |
|---|---|---|---|
| 737,979 | 9/1903 | Wadsworth | 350—261 |
| 1,740,278 | 12/1929 | Wood | 350—259 |
| 1,893,024 | 1/1933 | Gill. | |
| 2,382,566 | 8/1945 | Heckman. | |
| 2,810,604 | 10/1957 | Francis. | |
| 2,874,611 | 2/1959 | Luboshez | 350—263 |
| 3,009,389 | 11/1961 | Ewing. | |
| 3,255,665 | 6/1966 | Weiher et al. | 350—262 |

FOREIGN PATENTS 11,054   1908   Great Britain.

JULIA E. COINER, *Primary Examiner.*

U.S. Cl. X.R.

161—3; 350—263, 264